United States Patent

Taguchi

[15] 3,676,820

[45] July 11, 1972

[54] GAS DETECTING ELEMENT AND METHOD OF MANUFACTURING SAME

[72] Inventor: Naoyoshi Taguchi, 1-2, Ikedauemachi, Nagata-ku, Kobe, Japan

[22] Filed: Jan. 30, 1970

[21] Appl. No.: 7,150

[30] Foreign Application Priority Data

Feb. 6, 1969 Japan....................................44/9088
Feb. 6, 1969 Japan....................................44/9089

[52] U.S. Cl.....................................338/34, 23/254 E, 73/27
[51] Int. Cl.....................................H01c 13/00, H01c 17/00
[58] Field of Search.................338/34; 73/23, 27; 23/254 E; 324/71 SN

[56] References Cited

UNITED STATES PATENTS

| | | | |
|---|---|---|---|
| 3,479,257 | 11/1969 | Shaver | 23/254 E X |
| 3,138,948 | 6/1964 | Pfefferle | 23/254 E X |
| 3,437,446 | 4/1969 | Pierce | 23/254 E X |
| 3,092,799 | 6/1963 | Baker | 338/34 |

*Primary Examiner*—Benjamin A. Borchelt
*Assistant Examiner*—R. Kinberg
*Attorney*—Eugene E. Geoffrey, Jr.

[57] ABSTRACT

A gas detecting element formed of a semiconductor material capable of adsorbing gases and exhibiting a relatively high change in electrical conductivity, the semiconductor material containing gold, gold oxide or a compound convertible into gold or gold oxide after mixture with said semiconductor material and the method for making such an improved detector.

8 Claims, 3 Drawing Figures

INVENTOR.
NAOYOSHI TAGUCHI
BY
ATTORNEY

GAS DETECTING ELEMENT AND METHOD OF MANUFACTURING SAME

This invention relates to gas detecting elements and more specifically to a gas detecting element utilizing a semiconductor material which adsorbs gases and thereby changes its electrical conductivity.

It is well known in the art that one group of metal oxide semiconductor materials such as $SnO_2$, ZnO, $Fe_2O_3$, and $TiO_2$ adsorbs gases such as hydrogen, carbon monoxide, smoke and alcohol vapor. These gases have a reducing effect and increase electrical conductivities when N-type semiconductor material is used. In the case of P-type metal oxide semiconductors such as NiO, $Cr_2O_3$, and $Cu_2O$ adsorption of gases such as oxygen, chlorine and sulfur dioxide have an oxidizing effect and again increases their electrical conductivities. N-type and P-type semiconductors will exhibit decreases in their electrical conductivities when adsorbing gases having effects opposite to those described above. A further group of metal oxide semiconductors such as heated $In_2O_3$ which are referred to as intrinsic semiconductors will exhibit an increase in electrical conductivities when they adsorb either hydrogen or oxygen.

While the gas detecting elements discussed above have been well known in the art, their rate of change of conductivities at the time of adsorption of gases is relatively low and accordingly considerable time is required in making measurements.

One object of the invention resides in the provision of an improved semiconductor gas detecting element having greatly increased sensitivity which is attained by increasing the rate of change of conductivity.

Another object of the invention resides in the provision of novel and improved semiconductor materials wherein the rate of change of electrical conductivities with the adsorption is attained by the addition of gold or gold oxide.

Still another object of the invention resides in the provision of a novel and improved semiconductor material for use as a gas detecting element which material is of porous construction and enclosed within a porous material.

The above and other objects of the invention will become more apparent from the following description and accompanying drawings forming part of this application.

Figure 1:
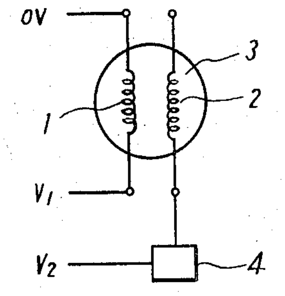
FIG. 1 is a schematic illustration of a general form of gas detecting element and associated circuitries.

Referring now to FIG. 1 which illustrates a general form of gas detecting element, the numeral 1 denotes a coiled heater while the numeral 2 denotes a coiled electrode. Both the heater and the electrode are embedded in an N-type semiconductor material 3 as for instance $SnO_2$ and are spaced from one another at a predetermined distance. The heater 1 is generally formed of platinum wire having a resistance of approximately 2 ohms for example. The heater functions to heat the semiconductor material to an operating temperature of the order of 150° C to 350° C because such materials are not sensitive at lower temperatures such as room temperature. A voltage $V_1$, for example one volt, is applied across the heater 1. One terminal of the electrode 2 is connected through an electrical device 4 to a source of voltage $V_2$. The electrical device 4 may be an alarm device such as a buzzer or lamp or an active device such as an electromagnetic relay or small motor.

When a reducing gas as described above is adsorbed by the semiconductor $SnO_2$, the electrical conductivity of the semiconductor increases and current flows from the heater 1 to the electrode 2 and thence through the electrical equipment 4 energizing such equipment. In order to energize the equipment 4, a sufficient voltage $V_2$ must be applied.

Figure 2:
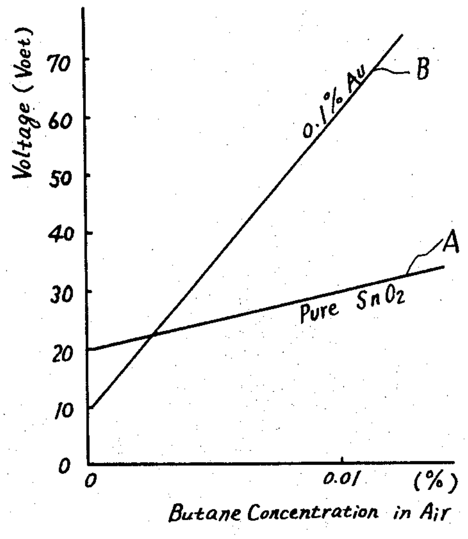
FIG. 2 is a graph illustrating the improved sensitivity of a detector in accordance with the invention.

Referring to FIG. 2, the graph A represents the voltage which is applied across the equipment 4 with various concentrations of butane in air when the resistance of equipment 4 is approximately 4,000 ohms and the voltage is approximately 100 volts. It is evident from graph A that $SnO_2$ is relatively insensitive to butane and therefore not particularly useful as a gas detecting element in this application. This is also true of other semiconductors such as ZnO, NiO, and $In_2O_3$.

The sensitivity of the semiconductor can be greatly increased in accordance with the invention by the addition of gold or gold oxide. Graph B of FIG. 2 shows the voltage developed across the equipment 4 when 0.1 percent of gold is added to the detecting element. It will be observed that the sensitivity of the element is approximately 10 volts in air and 60 volts in an atmosphere containing 0.01 percent of butane. This voltage change is sufficient for energizing the equipment 4. Similar results are obtained by the utilization of gold oxide or a compound which will be converted into gold or gold oxide during the formation process. Such a compound may be gold fluoride. It is believed that the reason for the improved sensitivity is that the gold or gold oxide exhibits a weak catalytic effect.

Further, improvement of the sensitivity of the detecting element can be attained by increasing the adsorption area of the element. In general practice, however, the mechanical strength of the element should be maintained as high as possible and normally semiconductor material is sintered at a high temperature. When a high mechanical strength is obtained by sintering, a proportional reduction in adsorption occurs by reason of the partial fusion caused by sintering. Accordingly, the higher the mechanical strength the lower the sensitivity of the element.

Figure 3:
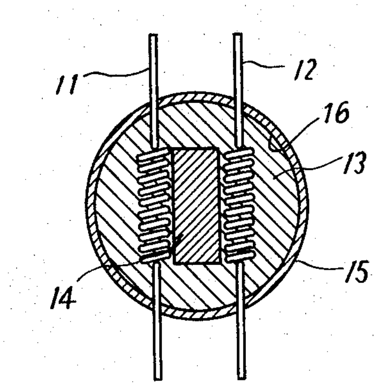
FIG. 3 is a cross-sectional view of a gas detecting element in accordance with the invention.

In accordance with another aspect of the invention, the element is formed with a relatively large adsorption area and mechanical strength is obtained by coating the element with a porous material. This structure is shown in FIG. 3. In this figure the coil platinum heater 11 and the coiled platinum electrode 12 are similar to the heater and electrode 1 and 2, respectively, of FIG. 1 and are arranged in mutually spaced relationship by means of a spacer 14 formed of glass or other similar material. The semiconductor body 13, for example $SnO_2$, is mixed in an equal amount of paraffin at a high temperature and is then applied over the heater 11, electrode 12 and the spacer 14 as shown in the drawing. Thereafter an electric current is passed through the heater 11 and electrode 12 to heat the element and burn the paraffin. This leaves a highly porous and sensitive body. The mechanical strength is then reinforced by applying an outer coating 15 of a porous material. The coating 15 may be formed of asbestos, glass fibers or cement, and a binder such as aluminum hydroxide.

One procedure for forming the element of FIG. 3 is to mix $SnO_2$ in heated paraffin and then apply the mixture to the electrode and heater as described above. After the paraffin and $SnO_2$ has cooled, a mixture comprising substantially equal parts of asbestos and aluminum hydroxide mixed in water is applied to the element. An electric current is then passed through the heater 11 and electrode 12 to simultaneously evaporate the water and the paraffin. Thereafter the temperature is raised to convert the aluminum hydroxide $Al(OH)_3$ to aluminum oxide $Al_2O_3$ to harden the asbestos coating. The resultant structure is highly sensitive to gases and has a high mechanical strength thus presenting a highly durable and reliable device. When aluminum ions must be prevented from permeating the element, a thin film 16 of polyvinyl alcohol may be applied to the semiconductor after evaporation of the paraffin but before application of the asbestos.

While only certain embodiments of the invention have been illustrated and described, it is apparent that alterations, modifications and changes may be made without departing from the true scope and spirit thereof as defined by the appended claims.

What is claimed is:

1. A gas detecting element comprising a porous semiconductor body capable of adsorbing gases and exhibiting a resultant change in electrical conductivity, said semiconductor material being intermixed with a material selected from the group consisting of gold, gold oxide, and a compound convertible into gold or gold oxide after mixture with said semiconductor body.

2. A gas detecting element according to claim 1 wherein said semiconductor body is enclosed within a reinforcing porous material.

3. A gas detecting element comprising a semiconductor material capable of absorbing gases and exhibiting a resultant change in electrical conductivity, said semiconductor material being intermixed with a material selected from the group consisting of gold, gold oxide, and a compound convertible into gold or gold oxide after mixture with said semiconductor material, said semiconductor material being enclosed within a porous material, said porous material being selected from the group consisting of asbestos, glass fibers and cement.

4. A gas detecting element comprising a semiconductor material capable of absorbing gases and exhibiting a resultant change in electrical conductivity, said semiconductor material being intermixed with a material selected from the group consisting of gold, gold oxide, and a compound convertible into gold or gold oxide after mixture with said semiconductor material, said semiconductor material being highly porous and containing a heater and an electrode spaced from said heater.

5. The method of making a gas detecting element comprising forming a heater and an electrode, forming a mixture of paraffin and a semiconductor material containing a material selected from the group consisting of gold, gold oxide, and a compound convertible into gold or gold oxide, enclosing said heater and electrode with said mixture and then heating said heater and electrode to remove said paraffin.

6. The method according to claim 5 including the step of coating said detecting element with a porous material selected from the group consisting of asbestos, glass fibers and cement.

7. The method according to claim 6 wherein said porous material is mixed with aluminum hydroxide and water and said process includes the step of heating said coating to evaporate the water and convert said aluminum hydroxide to aluminum oxide.

8. The method according to claim 6 including the step of coating said semiconductor material with a thin film of polyvinyl alcohol.

* * * * *